United States Patent [19]
Frohman et al.

[11] Patent Number: 5,418,835
[45] Date of Patent: May 23, 1995

[54] METHOD OF DELIVERING PAGING MESSAGES USING VOICE MAIL

[75] Inventors: Bradley L. Frohman, Bedford, Tex.; Christopher Lewis, Crystal Lake; Mark McGuire, Hoffman Estates, both of Ill.

[73] Assignee: Motorola Inc., Schaumburg, Ill.

[21] Appl. No.: 966,660

[22] Filed: Oct. 26, 1992

[51] Int. Cl.⁶ ............................................. H04M 11/00
[52] U.S. Cl. ......................................... 379/57; 379/59; 379/88
[58] Field of Search .................... 379/57, 58, 59, 67, 379/88, 89; 455/33.1; 340/311.1, 825.44

[56] References Cited

U.S. PATENT DOCUMENTS

| | | | |
|---|---|---|---|
| 4,882,744 | 11/1989 | Hashimoto | 379/89 |
| 5,151,929 | 9/1992 | Wolf | 379/57 |
| 5,153,903 | 10/1992 | Eastmond et al. | 379/57 |
| 5,237,321 | 8/1993 | Oliwa | 379/59 |

OTHER PUBLICATIONS

World Publication, WO 91/01604, Dey, "Paging Message Interface and Missed Message Retrieval Method", Feb. 1991.

*Primary Examiner*—Curtis Kuntz
*Assistant Examiner*—Dwayne D. Bost
*Attorney, Agent, or Firm*—Raymond J. Warren

[57] ABSTRACT

In a cellular communication system, the delivery of a page or message is attempted over the system to a user of the system. If the page or message is undeliverable before a set period of time, the page or message is converted to a voice mail message. The voice mail message is then stored in the cellular communication system. When the cellular communication system is accessed by the user, the user is notified of the existence of voice mail by either a text page or an automated voice radiotelephone call. The stored voice mail message is then delivered either automatically, or at the user's request.

8 Claims, 3 Drawing Sheets

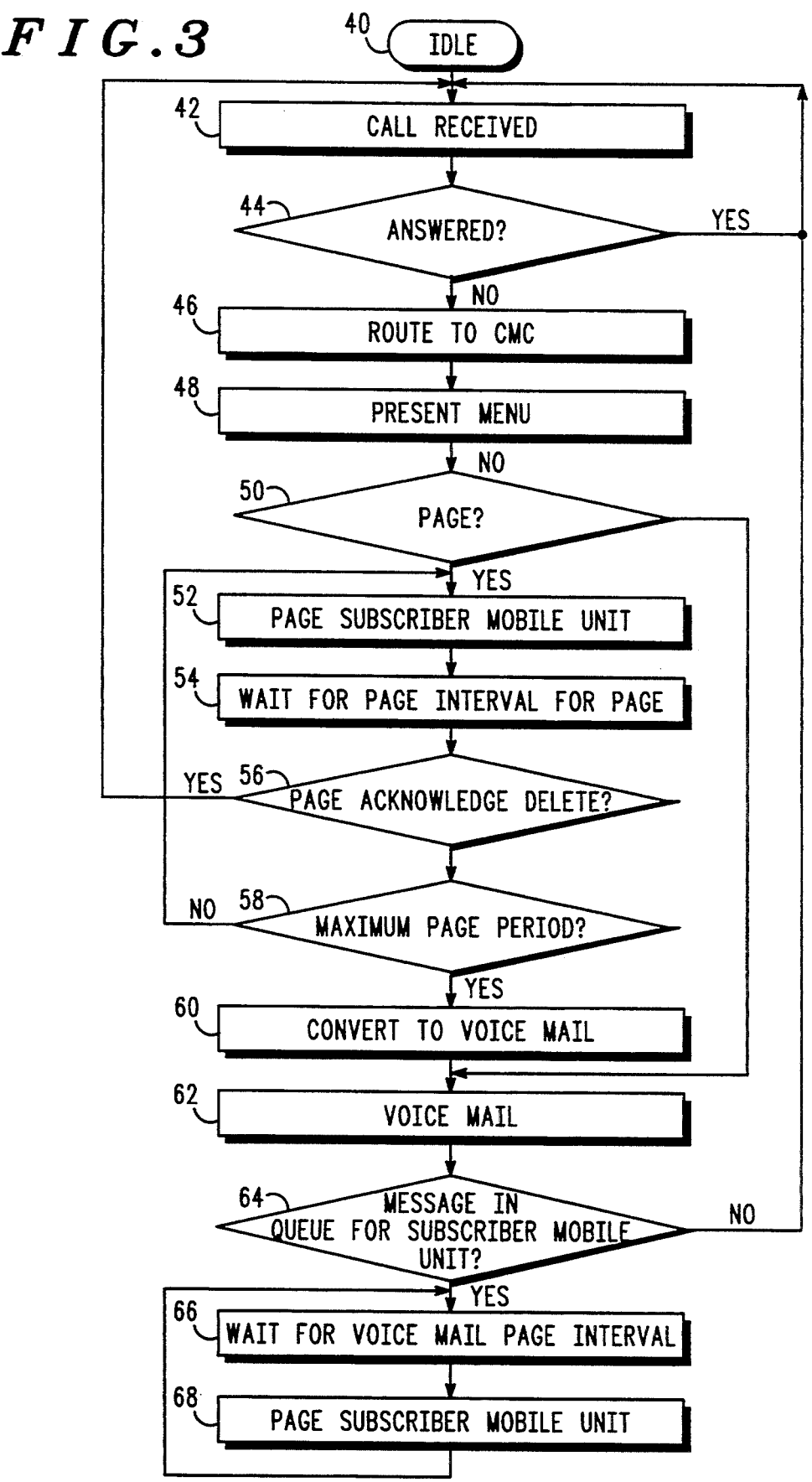

METHOD OF DELIVERING PAGING MESSAGES USING VOICE MAIL

FIELD OF THE INVENTION

The field of the invention relates to paging networks and, in specific, paging networks within cellular system.

BACKGROUND OF THE INVENTION

Wireless paging networks are known. Such networks typically transmit short paging messages (either audible or display) over wide geographic areas. Paging receivers (pagers) within such systems are typically constructed to monitor a paging channel for identification codes. Upon receipt of a code the pager compares the received code with an internal code. When the internal code matches the transmitted code the pager reproduces the paging message associated with such code on an output device for the benefit of a subscriber.

While such systems may be effective in the market for low-cost, rapid communication, they suffer from disadvantages associated with the one-way nature of such transmissions. Where a particular pager is deactivated, or out of range, paging messages directed to that paging receiver may be lost.

Other paging systems have been constructed with pagers that acknowledge paging notification messages. Such pagers are equipped with transmitters used to transmit a page acknowledge message upon detection of a page directed to the responding pager.

Where the system transmits a paging notification and the paging receiver doesn't respond (unit deactivated or out of range) the system periodically retransmits the page. Upon receipt of a paging acknowledgment by the system from the receiver, the system may immediately transmit the paging message as well as any other paging messages that have accumulated in a message queue maintained for the pager.

While deferral of message transmission until a page has been acknowledged reduces the incidence of lost messages, other problems may be experienced within such a system. Where a number of messages have accumulated in the system message queue and a page acknowledgment is received by a base site, the base site may immediately transmit all the messages in the queue. The immediate transmission of queued messages may overwhelm the storage capacity of the pager. Also, where a page acknowledge has not been received for an extended period the message queue may become filled, requiring that some messages be overwritten resulting in lost information. Because of the importance of paging systems a need exists for a method of delivering paging messages that avoids lost information.

SUMMARY OF THE INVENTION

A method and means of delivering paging messages in a cellular communication system, such method and means comprising the means for, and the steps of, paging the communication unit and, upon expiration of a paging period, converting the paging message into a voice mail message.

BRIEF DESCRIPTION OF THE DRAWINGS

FIG. 3 comprises a flow chart of the method delivering messages in accordance with the invention.

DETAILED DESCRIPTION OF THE PREFERRED EMBODIMENT

Figure 1:
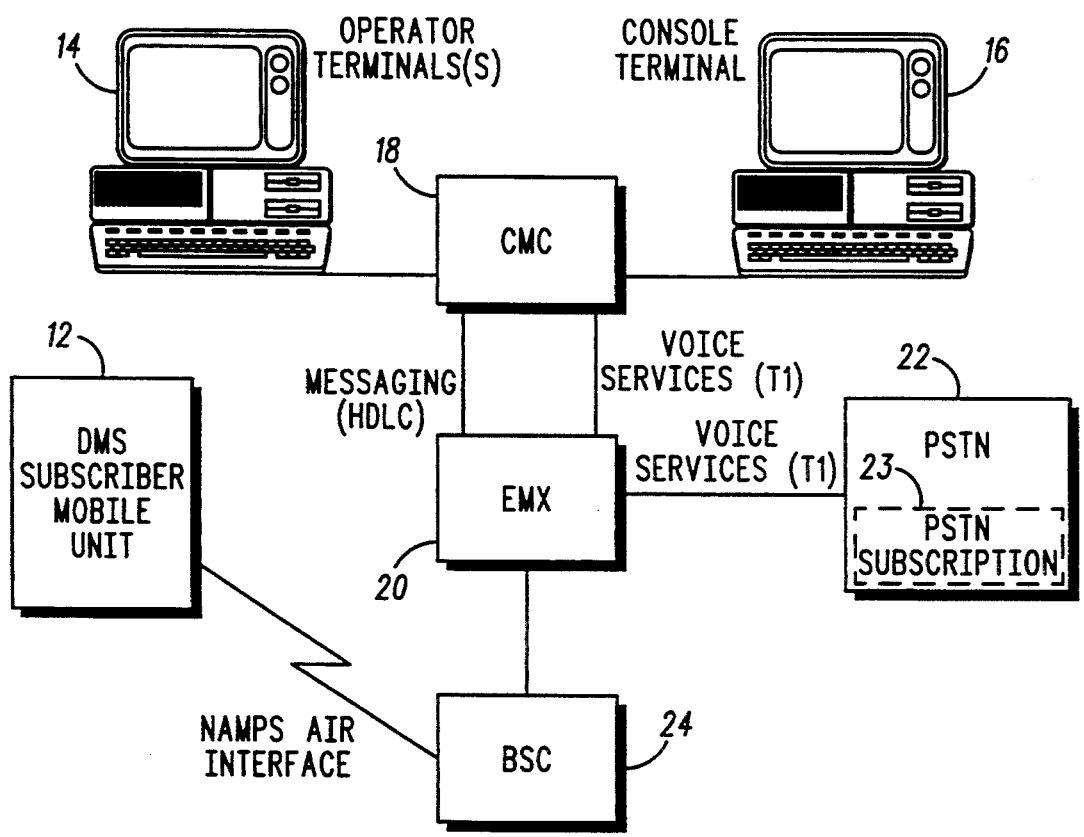
FIG. 1 comprises a block diagram of a cellular communication system in accordance with the invention.

The solution to the problem of queuing paging messages lies, conceptually, in removal of the oldest messages from the paging queue, converting the messages into voice mail and delivering such voice mail to the paging subscriber through a telephone interconnect. The criteria for removal of paging messages from the queue could be time or queue capacity. A message in the paging queue longer than 15 minutes is not as relevant as a message present for less than 5 minutes. A maximum page period (e.g., 15 minutes) could be set by the subscriber as the criteria for removal and conversion.

Queue capacity could be another parameter used to control conversion. Paging system users with a lower level of service may be paying for a lower capacity queue (e.g., 5 messages). If the number of messages entered into the queue within the maximum page period should exceed 5 messages then the oldest messages would be converted to voice mail.

Upon entry of a paging message into voice mail, a voice mail paging request may be transferred back to the paging system. The voice mail page notifies the subscriber of waiting messages. Voice mail notification may, also, be given the subscriber through a local telephone interconnect (e.g., at a place of business). Under the preferred embodiment a voice mail paging request is automatically generated within the voice mail system and transferred back to the paging system. In another embodiment of the invention in which paging and voice mail are part of separate systems a paging message is generated within the paging system notifying a paging subscriber that page messages have been converted to voice mail and stored within a voice mail system.

The paging system, upon receipt of such voice mail request, generates a voice mail paging message. The voice mail paging message is different from other subscriber paging messages in that voice mail messages are transmitted far less often. Whereas subscriber messages, if undelivered, may be transmitted every 3 minutes, voice mail notification is transmitted every 15 minutes, or once every half-hour. Voice mail notification also does not change in relation to the number of messages stored in voice mail.

In addition to being transmitted far less often, the voice mail page message provides the benefit of transmitting the same number of page messages, at the same time interval, no matter how many paging messages have been converted and stored in voice mail. Such voice mail page message provides indication of additional older messages, to a user, without system disruption or information loss.

Conversion of paging messages upon transfer from the paging system to the voice mail system occurs within the voice mail system and includes certain formatting changes. Since voice mail systems tend to be interactive (menu controlled) the paging messages is converted into a form compatible with such a system. To this end, information relative to time and date of receipt of the page may be combined with the paging message. Paging messages may then be combined with other voice mail messages under a last-in-first-out (LIFO) format, first-in-first-out (FIFO), or, under the preferred embodiment, accessed under a separate voice mail menu entry.

Playback of paging messages, under voice mail, may also be combined with information relative to source and time of receipt. As an example, the following audio information may precede an audio representation of the paging message "You received a digital page at 3 pm on Oct. 2, 1992. The message was "call office" (either spelled out or announced) or 708-555-1212".

Conversion of information within the page message may be performed under any of a number of different methods. Paging information may be converted using a voice synthesizer with an audio representation of the paging information stored on a storage medium (e.g., a computer disk). Information within a page message may also be stored as an ASCII file within a computer disk and converted to audio upon delivery to the voice mail subscriber.

Retrieval of paging messages stored under voice mail may be accomplished through the telephone interconnect at an office, pay phone, etc. or through a cellular telephone carried by the page subscriber. Paging messages may also be retrieved through a cellular telephone also adapted to receive paging messages through a digital message service (DMS Subscriber Mobile unit). One such cellular telephone capable of receiving paging messages is the narrowband advance mobile phone service (NAMPS) cellular telephone available from Motorola Inc.

The NAMPS cellular telephone is used under one embodiment of the invention because it is capable of functioning as a digital paging receiver as well as cellular telephone. During active calls by the NAMPS cellular telephone, paging messages may be received through subaudible signaling. (See U.S. Pat. No. 4,984,290, Levine, assigned to Motorola, Inc., for an explanation of NAMPS subaudible signaling during an active call). Page acknowledgments from an NAMPS telephone are also returned in the form of subaudible signaling.

During quiescent periods (telephone "on" but no active call in progress) the NAMPS telephone functions as do prior art pagers. One exception is that pages are transmitted to the NAMPS unit and acknowledgments are returned on the cellular signaling channel. A display on the NAMPS telephone provides visual indication of call back numbers (digital pages) or short text messages (short messages). During periods when the NAMPS telephone is de-activated, paging messages are queued or converted into voice mail messages.

FIG. 1 is a block diagram of an NAMPS pager and cellular telephone system (10), generally, in accordance with one embodiment of the invention. Included within such a system (10) is an electronic mobile exchange (EMX) (20), base site controller (BSC) (24), cellular message center (CMC) (18), console terminals (14 and public switch telephone network (PSTN) (22). Also shown in FIG. 1 is a DMS Subscriber Mobile unit (12).

EMX (20) may be of the type available from Motorola, Inc. and described in Motorola Instruction Manual No. 68P81054E59 published by Motorola Service Publications, Schaumburg, Ill. EMX (20) is implemented to provide cellular switching functions within a cellular network which is located outside the PSTN (22). EMX (20) is further coupled to a number of cellular base stations (24) (only one is shown in FIG. 1); one conventional cellular base station (24) may employ transmitters and receivers of the type described in Motorola Instructional Manual NO. 68P81058E32-A published by Motorola Service Publications, Schaumburg, Ill.

In addition to call control and switching functions, EMX (20) also provides control for the storage and delivery of paging messages and voice mail between the CMC (18) and DMS Subscriber Mobile Units (12). The CMC (18) may be of the type available from Motorola, Inc. and described in Motorola Instruction Manual No. 68P09212A30 published by Motorola Service Publications, Schaumburg, Ill.

FIG. 3 is a flow chart of system (10) operation under one embodiment of the invention. Reference will be made to the flow chart (FIG. 3) as appropriate in understanding the invention.

By way of example, a PSTN Subscriber (23) within the PSTN (22) dials a cellular access number for the DMS Subscriber Unit (12). The PSTN (22) routes the call to the EMX (20) (42). The EMX (20) causes a call page to be transmitted from each of the BSCs (24) within the system (10) or through the BSC (24) where the DMS Subscriber Unit (12) has last registered. If the DMS Subscriber Unit (12) answers (44) the call proceeds as a cellular telephone call. If the Subscriber Unit (12) does not answer (unit turned off or call-in-progress) then the EMX (20) routes (46) the call to the CMC (18).

Figure 2:
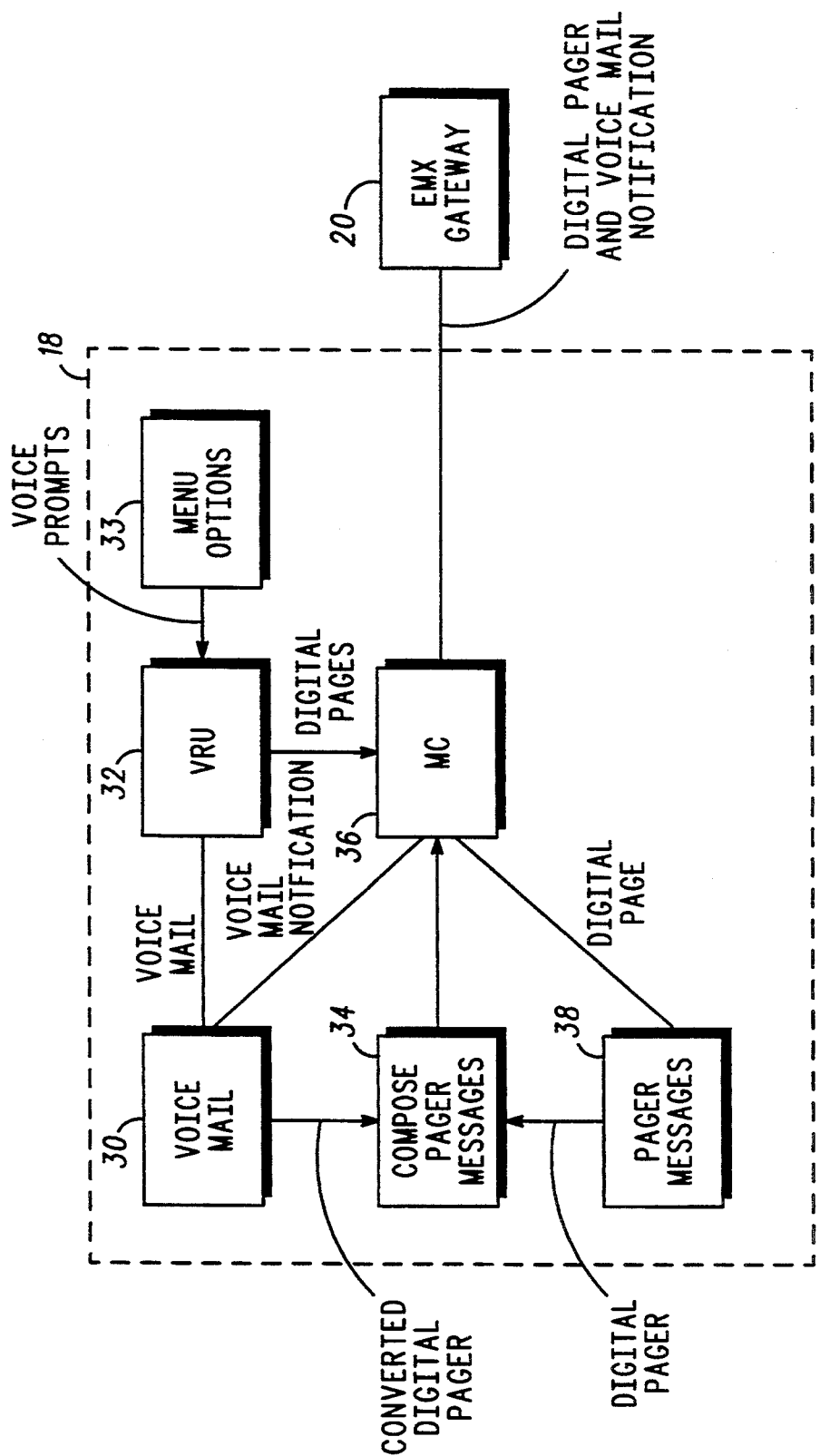
FIG. 2 comprises a block diagram of a cellular message center in accordance with the invention.

Within the CMC (18) a message controller (MC) (36, FIG. 2) receives the call and presents menu options (48) to the caller from an audio synthesizer (38). The PSTN subscriber (23) may choose voice mail or paging. If the subscriber (23) chooses (48) paging a memory location is allocated within a page message memory (38) within the CMC (18). The MC (36) prompts the subscriber (23) to enter a page message. Upon entry of the page message the entry within the page messages memory (38) is complete and the call is terminated.

Upon completion of the page message a paging request is composed (34) and communicated from the MC (36) to the EMX (20). Upon receipt by the EMX (20), a page message is transmitted (52) through each BSC (24) for the benefit of the DMS Subscriber Mobile Unit (12). After a page interval (e.g., 3 minutes) the page is repeated.

The page is repeated until the process has been repeated for a maximum page period (e.g., 15 minutes). When the maximum page period has been exceeded the MC (36) deletes (56) the page from the page message memory (38), converts (60) the message to voice mail and stores the message in the voice mail memory (30).

Within the voice mail memory (30) the message is retained until retrieved by the DMS Subscriber Mobile Unit or by the subscriber through some other telephone interconnect. While a voice mail message remains within the voice mail memory (30) a voice mail page is composed (34) at regular intervals equal to a voice mail page interval (e.g., 15 minutes). The voice mail page is communicated by the MC (36) to the EMX (20). The EMX (20), in turn, causes the BSCs (24) to transmit the voice mail page to the DMS Subscriber Mobile Unit (12).

Upon receipt of the voice mail page the DMS Subscriber Mobile Unit (12), as part of the page, receives the telephone access number of voice mail within the CMC (18). Upon dialing the access number the DMS Subscriber Mobile Unit (12) is presented with options for retrieving voice mail. Upon retrieval of such voice mail the retrieved mail may be retained or deleted as desired by the DMS Subscriber Mobile Unit (12).

We claim:

1. A method of delivering a text paging message in a cellular communication system, such method comprising the steps of:
   paging a communication unit over said cellular communication system;
   upon expiration of a paging period, converting the text paging message into a voice mail message; and
   delivering the voice mail message over said cellular communication system.

2. The method as in claim 1 further comprising the step of receiving a text paging message at a base site of the cellular communication system.

3. The method as in claim 1 wherein the step of paging the communication unit further comprising transmitting a page notification from a base site on a radio frequency channel.

4. The method as in claim 1 further comprising the step of storing the voice mail message in a voice mail storage system.

5. The method as in claim 1 further comprising the step of periodically transmitting a voice mail notification message to the communication unit.

6. A method of delivering a text paging message to a cellular communication unit within a cellular communication system having a plurality of base sites, such method having the steps of:
   A) transmitting a page notification from each of the plurality of base sites;
   B) waiting a maximum page period for a page response from the cellular communication unit;
   C) upon expiration of the maximum page period, converting the text paging message into a voice mail message and storing said voice mail message within a voice mail system; and
   D) delivering the voice mail message under a voice mail format over a first base site of said plurality of base sites.

7. In a wireless communication system having a paging subsystem and a voice mail subsystem, a method of delivering a text paging message to a communication unit in said wireless communication system, said method comprising the steps of:
   forwarding said text paging message to be delivered to said paging subsystem of said wireless communication system;
   transmitting said text paging message from a base site of said wireless communication system;
   converting said text paging message to a voice mail message unless an acknowledgment is received from said communication unit that said text paging message was received;
   saving said voice mail message in said voice mail subsystem;
   deleting said text paging message from said paging subsystem;
   storing a voice mail notification message in said paging subsystem for transmission to said communication unit;
   transmitting said voice mail notification message to said communication unit over said wireless communication system; and
   retrieving said voice mail message over said wireless communication system.

8. The method of claim 7 wherein said step of transmitting said voice mail notification message is executed when said communication unit registers with said wireless communication system.

* * * * *